United States Patent [19]
Saccomanno, III

[11] Patent Number: 5,806,859
[45] Date of Patent: Sep. 15, 1998

[54] SELF-CONTAINED COLLET ADAPTOR

[76] Inventor: Matthew Saccomanno, III, 1414 Ridgeway St., Oceanside, Calif. 92054

[21] Appl. No.: 669,026

[22] Filed: Jun. 24, 1996

[51] Int. Cl.⁶ ........................................ B23B 31/20
[52] U.S. Cl. ................................ 279/143; 279/51
[58] Field of Search ........................ 279/51–53, 143, 279/145

[56] References Cited

U.S. PATENT DOCUMENTS

| | | | |
|---|---|---|---|
| 2,478,195 | 8/1949 | Hull | 279/145 |
| 3,472,105 | 10/1969 | Ono | 82/38 |
| 3,874,688 | 4/1975 | Schiller | 279/50 |
| 4,477,095 | 10/1984 | Atkinson, III | 279/145 |
| 4,496,163 | 1/1985 | Bernfeld | 279/1 A |
| 4,602,798 | 7/1986 | Wettstein | 279/143 |
| 5,431,416 | 7/1995 | Thornton | 279/4.08 |

OTHER PUBLICATIONS

100 (5 pages) Saccomanno Allied Swiss Screw Products, Inc. Drawings 1987 Cates.

Primary Examiner—Steven C. Bishop

[57] ABSTRACT

A hollow body and drawbar coupler connect to form a collet adaptor with external configuration matching that of a commonly available draw-style spring collet. A receptacle at the anterior portion of the body holds the adapted collet. Tension applied by a machine tool drawbar is transmitted through the draw bar coupler and draw tube to actuate the adapted collet. A stop sleeve within the adaptor body limits the draw stroke, and thus the clamping force applied to the collet. The collet is threaded inward or outward by a machine operator to adjust clamping force. A keying ring within the adaptor maintains radial position of the collet via a friction mechanism. Differentially threaded engagements of the adaptor drawbar with the adapted collet and the body provide a self contained means for clamping the collet when the adaptor is removed from the machine tool. An optional unitary, cylindrical protuberance provides an extended nose for improved access to a chucked workpiece.

20 Claims, 5 Drawing Sheets

SELF-CONTAINED COLLET ADAPTOR

BACKGROUND

1. Field of Invention

This invention relates to an apparatus to hold a draw-type spring collet of the kind generally used in turret lathes, engine lathes, milling machines, grinders, and other machine tools and processes, and, more particularly, to an adapter enabling acceptance of a range of different collet styles by a receptacle of a given collet style.

2. Description of Prior Art

Draw-type spring collets are commonly used in industry to provide robust and accurate holding, primarily of cylindrical workpieces, tools, etc. The ability to quickly open and close the collet with a drawbar mechanism facilitates rapid workpiece loading and high production efficiency.

A collet receptacle of a machine tool is generally made to fit a specific collet style of standardized external configuration. That is, typically such a collet includes a given standardized configuration of cylindrical shank with threaded end of predetermined dimensions and thread characteristics, while at its other end the head is varied according to workpiece size and function. For example, the style of collet known as "5C" is commonly available and widely used in the USA. A broad variety of machine tools are available with receptacles to fit this popular style. A multitude of other collet styles is available, these other styles having unique advantages to suit particular work conditions. To make use of these advantages it is often desirable to utilize a variety of collet styles, yet a given collet receptacle generally accepts only one particular collet style. Hence the need to adapt one collet style to another.

All earlier and existing adaptor devices have some or all of the following disadvantages:

(a) A lengthy or complicated mounting procedure is required to install the adaptor on a machine tool.

(b) The adaptor requires removal of some or all of the components of the chucking mechanism of a machine tool.

(c) The adaptor is specifically proportioned to fit a particular machine tool, and is therefore not interchangeable amongst various machine tools.

(d) The adaptor must be removed from the machine tool in order to change a collet. This adds to setup time and can cause difficulty if work space is limited.

(e) The adaptor is large and bulky, adding to the cost of manufacture, storage, shipping, etc.

(f) Through-collet access is constricted or blocked by some components of the adaptor, which impedes its use with bar stock machining, through-spindle coolant feed, certain axially locating workpiece stop devices, etc.

(g) The standard collet closing mechanism of a machine tool, which is suited for a large collet receptacle, may exert excessive or irregular collet closing force that is undesirably translated to the smaller collet in the adaptor. This is a particular problem when machining small, delicate workpieces that are easily damaged by collet clamping force.

(i) Small collets like those for which an adaptor is desired are generally used to hold small workpieces. These small workpieces are generally machined using proportionately small cutting tools that must be clamped with proportionately less protrusion from tool holders in order to maintain satisfactory rigidity. The machine tool structure surrounding the workpiece collet receptacle can interfere with tool holders and is cause to require increased protrusion of a cutting tool from its holder, with corresponding degradation of rigidity. To prevent this degradation, it is desirable to protrude the workpiece outward from the machine tool, in as rigid a manner as possible, to provide clear access to the workpiece by the cutting tools. This is one reason for the commercial success of such items as the "Extended Nose Collet" supplied by Hardinge Inc., Elmira, N.Y. Many existing collet adaptors are of a design that transmits the closing force to the collet using cantilevered jaws or tines, either of which become undesirably flexible as they are lengthened to achieve this beneficial "extended nose" configuration.

OBJECTS AND ADVANTAGES

Accordingly, several objects and advantages of my invention are:

(a) to provide a collet adaptor whose method of installation in a machine tool is as quick and easy as that of a normal collet;

(b) to provide a collet adaptor that can be readily installed without removing or altering any normal feature of a machine tool, and without any special preparatory operation being performed to the machine tool;

(c) to provide a collet adaptor that fits readily in any machine tool or attachment that has a given standard collet receptacle;

(d) to provide a collet adaptor that allows changing of a collet without requiring the additional action of removing the adaptor from the machine tool in which it is mounted;

(e) to provide a collet adaptor that is self-contained, physically compact and able to be stored in a manner similar to that of a normal collet, such as in a commonly available collet rack;

(f) to provide a collet adaptor that does not constrict or block access all the way through a collet, and thus allows full use with bar stock, workpiece stops, through-spindle coolant feed, etc.;

(g) to provide a collet adaptor capable of controlling the closing force exerted upon the adapted collet by providing a precise and adjustable limit of axial transmittance of the machine tool drawbar movement to the adapted collet;

(i) to provide a design that is optimal for the production of a collet adaptor with an extended nose which rigidly supports the collet and workpiece in a protruding position, away from the interfering effect of the machine tool structure.

An additional object of the present invention is to provide a collet adaptor with self-contained means of exerting a closing force upon the adapted collet and its workpiece, such that the adaptor may be transferred from machine to machine while the workpiece remains fixedly clamped within the collet and adaptor. This gives an advantage of maintaining the accuracy of workpiece fixation for subsequent processes such as milling, grinding, dimensional measurement, etc.

Further objects and advantages of my invention will become apparent from a consideration of the drawings and ensuing description.

DRAWING FIGURES

REFERENCE NUMERALS IN DRAWINGS

| | | | |
|---|---|---|---|
| 8 | extended nose | 60 | conical surface of machine tool collet receptacle |
| 10 | body | | |
| 12 | pin | 62 | keyway of adapted collet |
| 14 | external retaining ring | 64 | conical surface of adaptor's collet receptacle |
| 16 | keying ring | 66 | collet wrench |
| 16a–16f | various embodiments of a keying ring | 68 | blades of collet wrench |
| 17 | draw tube | 70 | slots of adapted collet |
| 18 | friction pellet | 72 | mounting holes |
| 19 | draw tube (anterior portion) | 74 | pin-style protrusion |
| 20 | draw tube (mesial portion) | 76b–76c | elastomeric ring |
| 21 | draw tube (posterior portion) | 78 | spring-like ring |
| 22 | spring | 80 | opening |
| 24 | stop sleeve | 82 | set screw with spring-loaded ball plunger |
| 26 | internal retaining ring | 84 | detents |
| 28 | set screw | 86 | set screw |
| 29 | threaded engagement of draw tube and drawbar coupler | 88 | posterior bore of adaptor body |
| 30 | drawbar coupler | | |
| 32a | socket for pin (body) | | |
| 32b | socket for pin (coupler) | | |
| 38 | commonly available draw-style spring collet | | |
| 40 | machine tool structure containing a collet receptacle | | |
| 42 | internal groove for retaining ring | | |
| 44 | draw-style spring collet subject to adaption | | |
| 46 | threaded configuration that fits the adapted collet | | |
| 48 | workpiece | | |
| 50 | protrusion of keying ring | | |
| 52 | slots in draw tube | | |
| 54 | drawbar of machine tool | | |
| 56 | driver hand tool | | |
| 58 | collet adaptor assembly | | |

DESCRIPTION

FIGS. 1–3, 5a–5f

Figure 1:
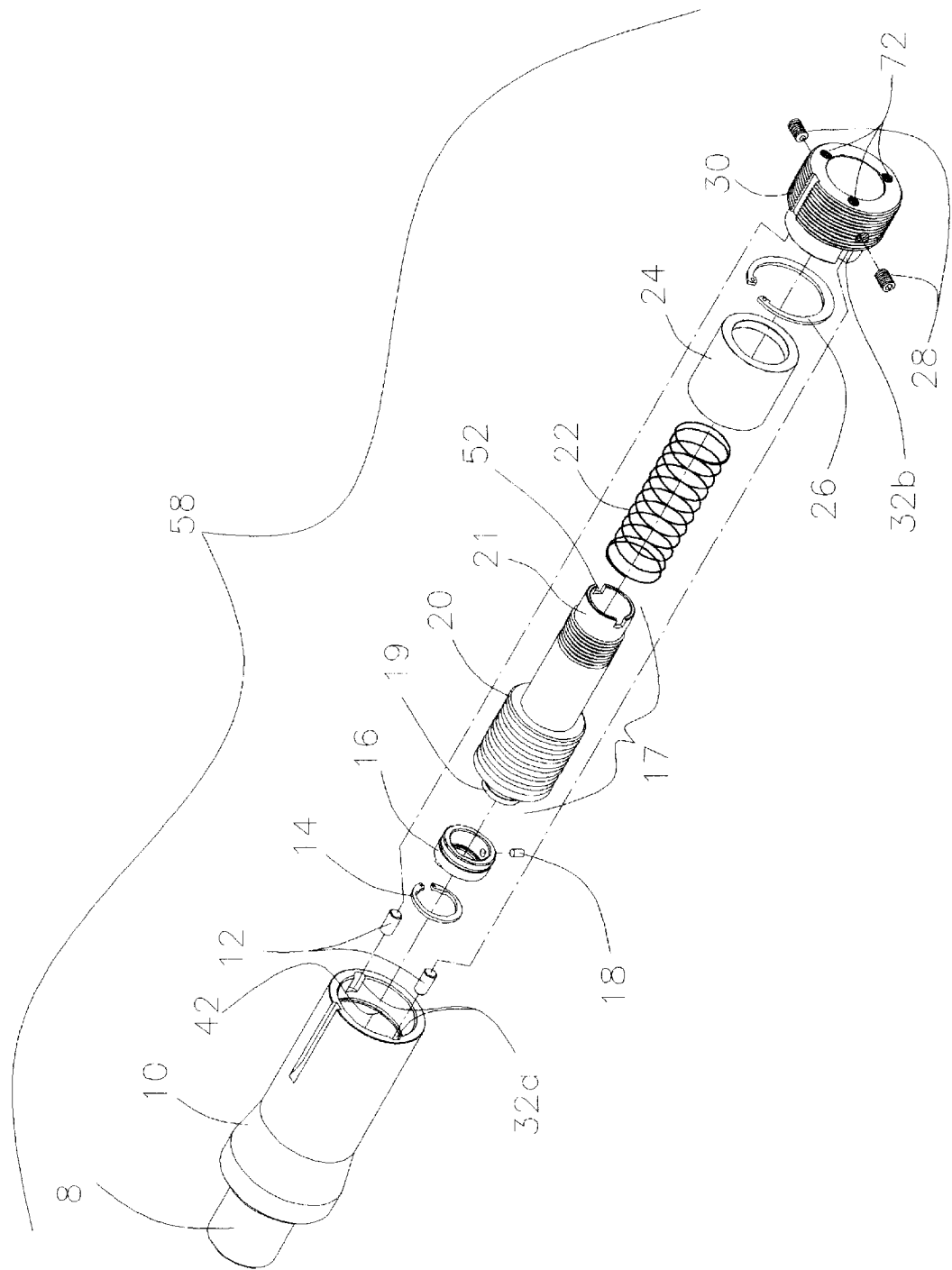
FIG. 1 is an exploded isometric view of a collet adaptor.
Figure 2:
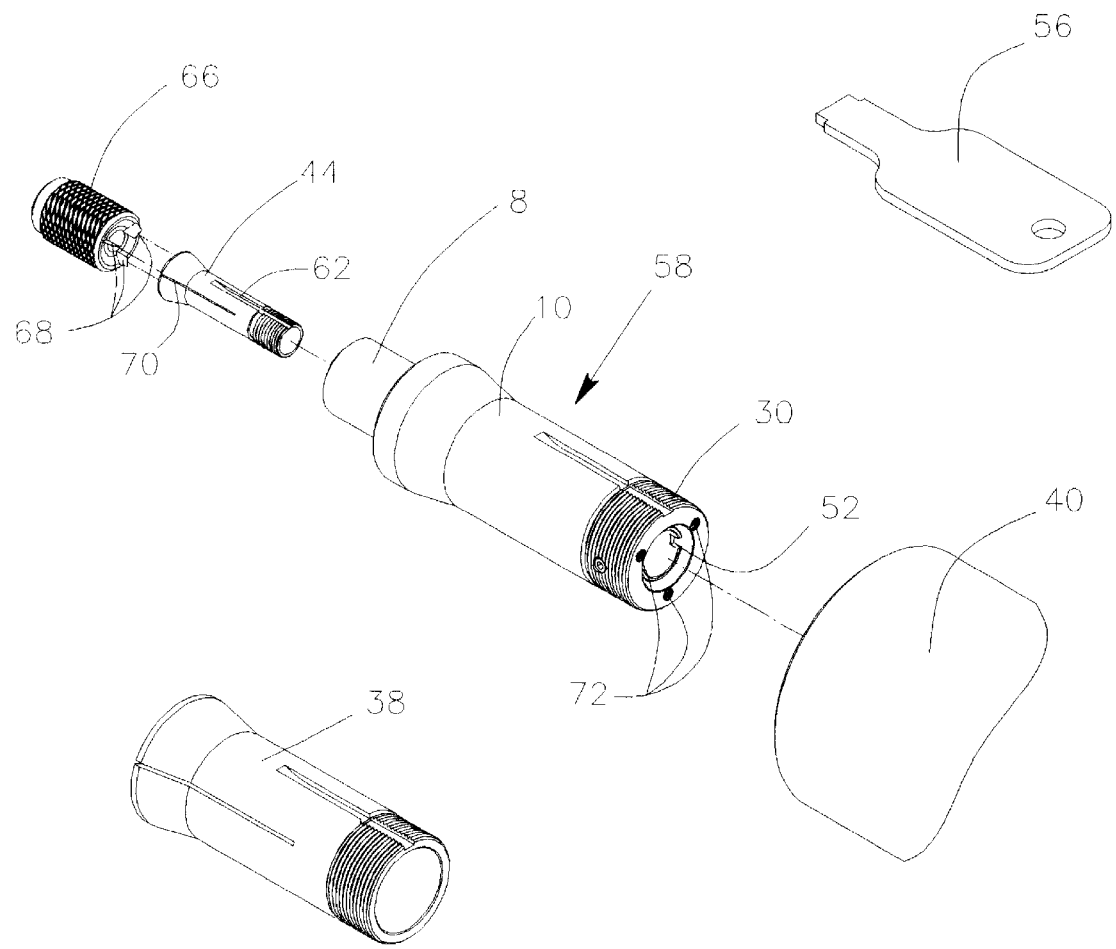
FIG. 2 is an exploded isometric view showing a fully assembled collet adaptor in comparison to a standard collet of matching style, and in conjunction with a smaller collet utilizing the adaption, and part of a machine tool structure.
Figure 3:
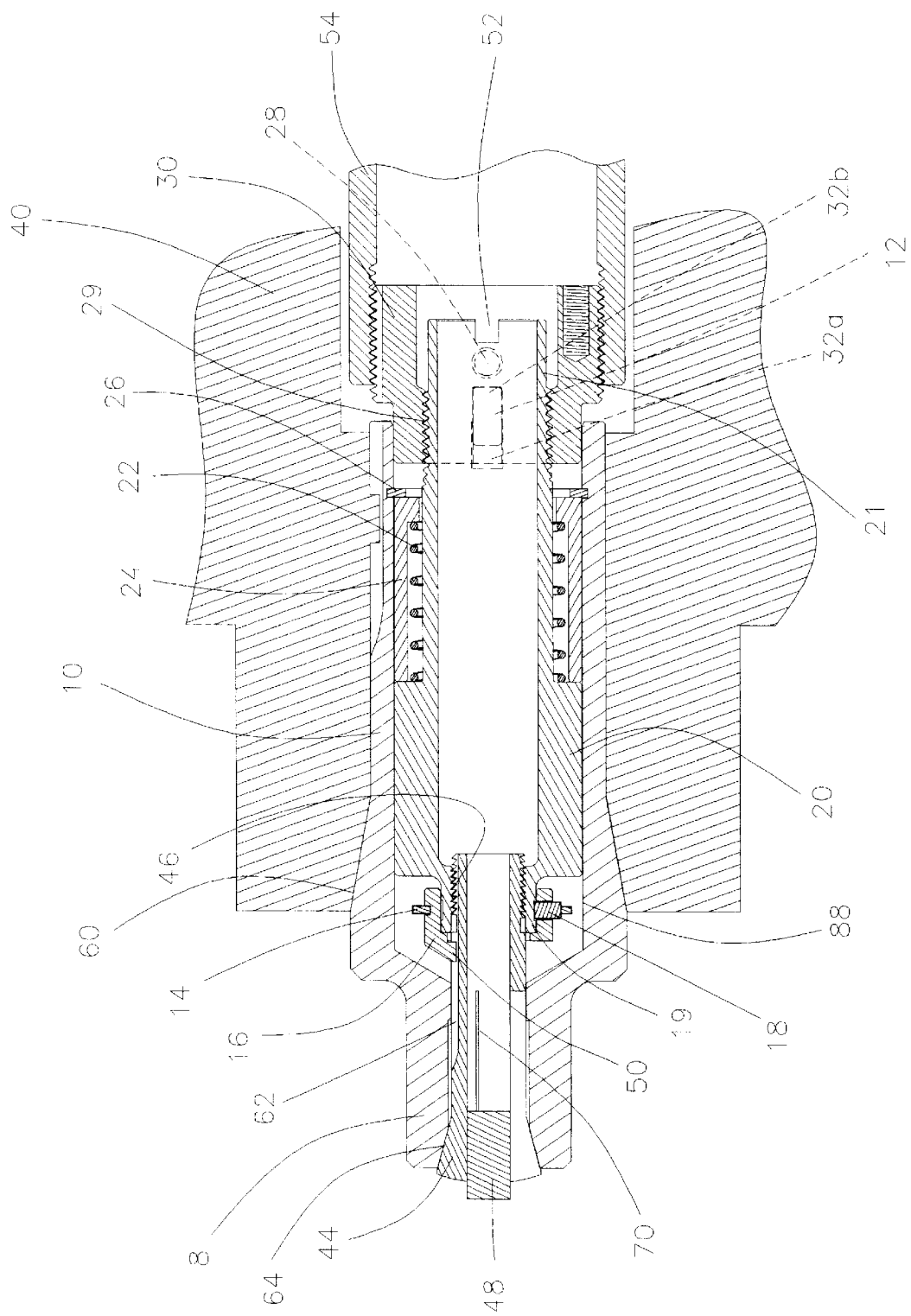
FIG. 3 is a sectional side view of a collet adaptor with adapted collet and workpiece in the clamped position in a machine tool.

A preferred embodiment of the adaptor of the present invention is illustrated in FIG. 1 (exploded isometric view), FIG. 2 (isometric view) and FIG. 3 (sectional side view). Shown is a substantially cylindrical and hollow body 10 slidingly engaged with an externally threaded drawbar coupler 30, together the external form of which compatibly matches that of a given commonly available draw-style spring collet 38 (FIG. 2). The configuration of the body includes an extended nose 8, which serves to project a given adapted collet and workpiece some desired distance outward from the machine tool structure 40. The extended nose may be excluded in an optional embodiment (not shown).

Referring to FIGS. 1 and 3, an internal retaining ring 26, fixedly seated in an internal groove 42 within the body 10, axially secures a cylindrical stop sleeve 24 within the posterior bore 88 of the body 10 (FIG. 3). A spring 22 coaxially inserted into the stop sleeve 24 seats endwise against an internal flange at the posterior end of the stop sleeve. At its other end the spring 22 bears against an external shoulder of a slidable draw tube 17 which is substantially cylindrical and hollow.

The mesial portion 20 of the draw tube 17 slidingly fits within the posterior bore 88 of the body 10. The draw tube 17 extends through the spring 22, stop sleeve 24, and retaining ring 26, into the drawbar coupler 30. The drawbar coupler 30 is drivingly attached to the draw tube 17 via a connecting thread. Set screws 28, entering through threaded cross-holes in the wall of the drawbar coupler 30, bear against the posterior portion 21 of draw tube 17 to rotationally fix the draw tube to the coupler. The machine tool drawbar 54 drivingly engages the drawbar coupler 30 (FIG. 3) in a manner identical to that in which it would engage a given commonly available draw-style spring collet 38 (FIG. 2).

The drawbar coupler 30 includes an anterior cylindrical portion that slidingly fits within the posterior bore 88 of the body 10. Referring to FIG. 1, semi-cylindrical sockets 32a and 32b in the walls of both the body (socket 32a) and the drawbar coupler (socket 32b) cooperate to form glands in which are slidingly held pins 12 that serve as a means to radially key the coupler 30 to the body 10. Threaded mounting holes 72 on the posterior face of the draw tube coupler 30 illustrate a means for mounting accessories such as a workpiece stop, workpiece ejector, coolant conduit junction, etc. (not shown).

Referring to FIG. 3, the draw tube includes, at its anterior end 19, a threaded configuration 46 that fits a given draw-style spring collet 44 of a given style subject to the present adaption. Also shown is a workpiece 48 held in the collet 44. The collet 44 is rotationally restrained by engagement with a protrusion 50 of a keying ring 16. The keying ring 16, which is substantially cylindrical and hollow, slidingly fits upon the anterior portion 19 of the draw tube 17. A friction pellet 18 slidingly fits through a cross-hole in the keying ring 16. An external retaining ring 14, which is seated in a groove in the keying ring 16, bears upon one end of the friction pellet 18. The retaining ring 14 is expanded by its impingement upon the friction pellet 18, and the spring-like properties of the retaining ring force the pellet against the surface of the draw tube 17 in a manner that creates significant rotational friction between the keying ring 16 and the draw tube. The friction pellet 18 also serves to axially retain the keying ring 16 onto the draw tube 17 by its engagement with a groove on the exterior surface of the draw tube.

Referring to FIGS. 5*a* through 5*f,* additional embodiments of a keying ring include:

(FIG. 5*a*) A protrusion (whose function is similar to the protrusion 50 of FIG. 3) created by a pin 74 interference-fitted through a cross-hole in the wall of a keying ring 16*a;*

(FIGS. 5*b*, 5*c*) An elastomeric ring 76*b*, seated in a gland in the interior of a keying ring 16*b*, compressively impinges upon the anterior surface 19 of the draw tube 17 to produce rotational friction between the keying ring and the draw tube. A similar embodiment includes a keying ring 16*c* encircled by an elastomeric ring 76*c* that impinges upon an interior surface of the body 10 to produce rotational friction between the body and the keying ring. In embodiments similar to either of the preceding, a spring-like ring of substantially lobular profile (not shown) may be substituted for the elastomeric ring.

Figure 5D:
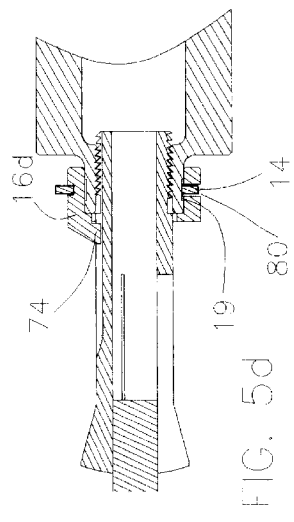
FIGS. 5a through 5f show various embodiments of a keying ring.
Figure 5E:
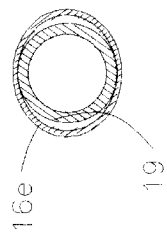
Figure 5F:
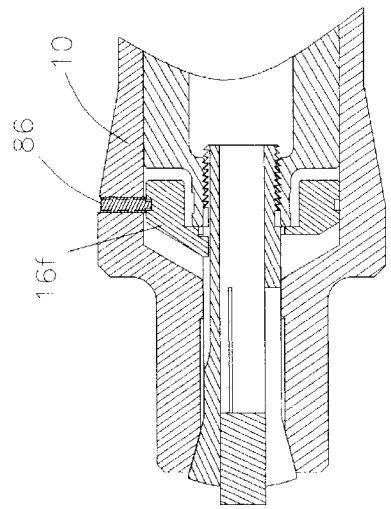
Figure 5A:
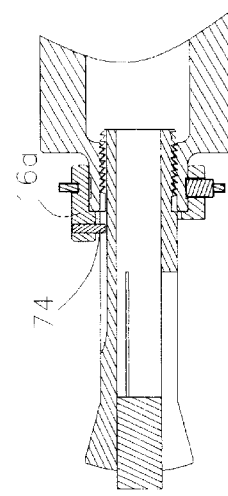
Figure 5B:
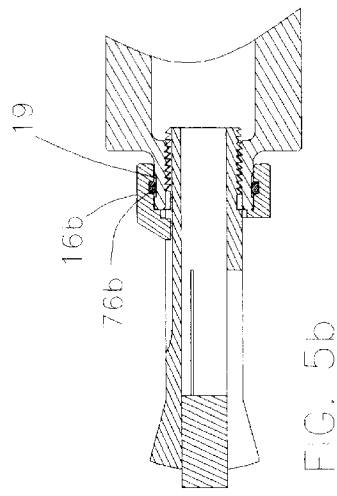
Figure 5C:
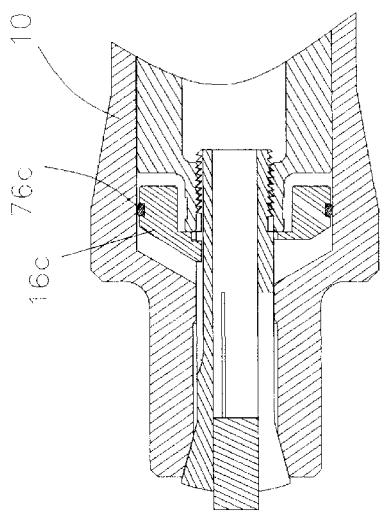

(FIG. 5*d*) An opening 80 in the wall of a keying ring 16*d*, through which a portion of a commonly available external retaining ring 14 passes to impinge upon the surface of the draw tube 19, thus creating rotational friction between the keying ring and the draw tube; An alternate embodiment substitutes a commonly available internal retaining ring impinging outward (not shown) upon an interior surface of the body 10 (FIG. 5*c*).

(FIG. 5*e*) A keying ring 16*e*, of substantially lobular shape and possessing spring like properties, impinges upon the anterior surface of the draw tube 17 to produce rotational friction between the keying ring and the draw tube. Another embodiment (not shown) has a lobular and spring-like keying ring impinging upon an interior surface of the body 10.

(Not Shown) A commonly available set screw with spring-loaded ball plunger is threaded through the wall of the keying ring and engages the draw tube, the surface of which may optionally include a multiplicity of radially spaced detents to receive the ball.

(FIG. 5*f*) A set screw 86, threaded through the wall of the body 10, bears upon the keying ring 16*f* to radially fix the keying ring.

Fixation of a stop sleeve 24 (FIG. 3) may be additionally embodied by a coaxial threaded engagement (not shown) of the stop sleeve 24 with the body 10. Alternately, a threaded retaining ring (not shown) may be used instead of the commonly available internal retaining ring 26.

As an alternate embodiment of the radial fixation function earlier attributed to the pins 12 of FIGS. 1 and 3, the drawbar coupler 30 has a lobular shape (not shown) engaging a matching lobular socket in the posterior bore of the body 10. Additionally, an eccentrically placed pin (not shown) in the drawbar coupler 30 and a receiving hole (not shown) in the posterior end of the body 10 can embody this radial fixation function.

Unless otherwise noted herein, the components of the present invention are made of a substantially solid and sturdy material, such as hardened tool steel, alloy steel, steel, iron, aluminum, magnesium, brass, bronze, plastic, ceramic, etc., in accordance with good manufacturing practice as known by a skilled artisan.

OPERATION

FIGS. 1–4

In the present context, "draw" refers to a pulling action commonly associated with draw-style spring collets.

In use, the collet adaptor assembly 58 is first installed in a given machine tool in a manner identical to that of a commonly available draw-style spring collet 38. That is, the adaptor 58 is inserted into a machine tool collet receptacle and threaded into the drawbar 54 of the machine tool (FIG. 3) using a given means normally utilized with the machine tool. Tension imparted by the drawbar of the machine tool forces the collet adaptor to abut firmly against the conical surface of the machine tool collet receptacle 60. This procedure does not require any alteration of the standard configuration of the machine tool, and typically can be completed in less than 5 minutes by a machine operator. Also, the adaptor can be similarly installed in any machine tool having the same style collet receptacle.

A collet 44 (FIG. 2), which is the subject of the present adaption, is inserted into the collet receptacle 64 of the adaptor 58 (FIG. 3). Upon insertion, the collet keyway 62 (FIGS. 2 and 3) engages the protrusion 50 (FIG. 3) of the keying ring. The collet 44 (FIG. 3) further slides into the receptacle 64 until it abuts the threaded configuration 46 of the draw tube 17. Collet wrench 66 includes a surface suitable for gripping by an operator, and thin, stiff blades 68 configured to mate with slots 70 of the collet. The collet wrench 66 is used to rotationally advance the collet into the draw tube thread 46. The adaptor and collet are now ready for operation. Typically this procedure can be completed in less than a minute by a machine operator. Furthermore, a collet can be removed and re-installed by this procedure, without removing the adaptor from the machine. This ability is very valuable when production setups require rapid changeover.

A typical scenario of operation for draw-style spring collets of the type utilized in the present adaptor is clamping and unclamping of individual workpieces to perform a machining operation on a plurality of substantially identical workpieces in a manufacturing lot. Machine tools that utilize draw-style collets typically actuate them via a longitudinal stroke of the machine tool's drawbar 54 (FIG. 3). Tension exerted by the drawbar upon a collet causes the collet to compress onto, and thus clamp, the workpiece. To unclamp, the drawbar exerts an opposite pushing force upon the collet.

During operation of the present adaptor, the aforementioned longitudinal movement of the machine tool's drawbar 54 is transmitted, via the drawbar coupler 30 and the draw tube 17, to the adapted collet 44. The draw tube 17 functions as a drawbar to actuate the collet. The tensile stroke of the draw tube 17 is firmly limited by its contact with the stop sleeve 24, thus limiting the clamping traverse of the adapted collet 44, and effectively controlling the clamping action regardless of the intensity of tensile force exerted by the machine tool's drawbar 54.

Very fine adjustment of clamping force is effected by threading the collet 44 inward or outward using the collet wrench 66 (FIG. 2). This adjustment is convenient and immediately accessible to the operator. The rotational position of the collet is maintained by the keying ring 16 (FIG. 3) via engagement of the protrusion 50 in the collet keyway 62. Extensive field tests, and the results of commercial distribution, have proven this method of clamping force adjustment to be quite effective and valuable. Machine tools that, by themselves, were incapable of holding fragile workpieces without damage were easily made to do so when using an adaptor of the present kind. This extends the versatility, and thus the value, of the machine tool.

Figure 4:
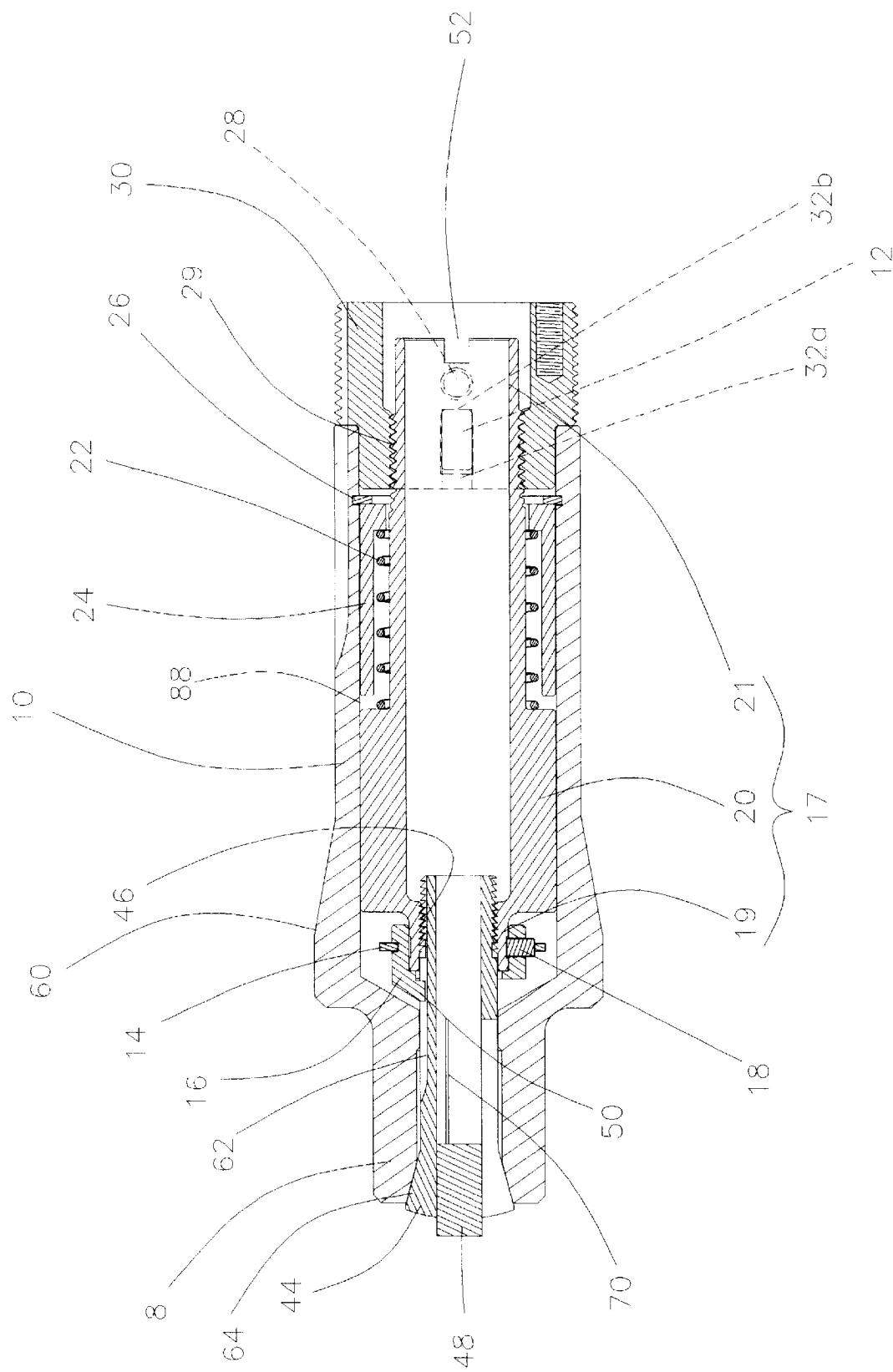
FIG. 4 is a sectional side view of a collet adaptor in the self-contained clamped state.

Another mode of operation involves fixedly clamping a workpiece in a collet within the adaptor and maintaining this clamped condition via a self-contained means of the adaptor. The adaptor is first prepared by loosening the set screws 28 (FIGS. 2 and 4) so the draw tube 17 can be rotated. Shallow slots 52 in the posterior end 21 of the draw tube 17 form a socket means of rotatably engaging the draw tube 17 via a driver hand tool 56. The draw tube 17 is rotated so it is thrust forward by the threaded engagement 29 with the drawbar coupler 30. The draw tube 17 is thus rotated and continues to shift forward until the keying ring 16 nearly contacts the body 10. Now, referring to FIG. 2, a collet 44 is installed in the adaptor using the collet wrench 66 as previously described. The collet 44 is threaded inward using the collet wrench 6 6 until it is just snug on the workpiece.

To effect clamping of the collet 44, the draw tube 17 (FIG. 4) is rotated so it is pulled back by its threaded engagement 29 with the drawbar coupler 30. The collet 44 moves in unison with the draw tube 17 until the collet 44 impinges upon the conical surface 64, causing rotational friction which exceeds that of the interfit of the keying ring 16 and the draw tube 17. As the draw tube 17 continues to rotate and move longitudinally rearward, it also begins to thread off of the collet 44. However, a thread of chosen lead is used, at the draw tube-coupler engagement 29, such that the rearward longitudinal movement of the draw tube 17 exceeds the counteracting threading movement at the collet 44. This results in significant tension being applied to the collet 44 by the draw tube 17. In this manner a workpiece 48 can easily be clamped powerfully in the collet 44 with the application of minimal torsional effort by hand. Thus clamped, the work can then be moved from machine to machine, for multiple operations, without loss of clamping accuracy or radial orientation of the workpiece.

I claim:

1. An adaptor comprising, in combination:
   a socket means of receiving a given collet;
   a mounting means whose form is compatibly received by a given machine tool;
   a drawbar means of transmitting an actuating force to said collet from said machine tool;
   a drawbar stroke limiting means;
   a means for adjusting the longitudinal position of said collet with respect to said drawbar and said socket in substantially small increments;
   whereby the actuating force transmitted from said machine tool to said collet is effectively limited by said adaptor and is readily adjustable by a machinist.

2. The adapt or of claim 1 wherein said mounting means comprises a form that is compatibly received by a given collet receptacle of said machine tool, whereby installation of the adaptor in said machine tool occurs in a manner significantly similar to that of a given commonly available collet of a type compatible with said receptacle of said machine tool.

3. The adaptor of claim 1 wherein said socket means is supported a predetermined distance outward from said machine tool by a substantially cylindrical, coaxial, and unitary protuberance of the adaptor, said protuberance being of substantially smaller diameter than the external structure of said collet receptacle of said machine tool, whereby the accessibility of given tooling to a given workpiece clamped in a given collet within the adaptor is enhanced over the alternate condition of said workpiece being clamped in a given collet directly within said collet receptacle of said machine tool.

4. The adaptor of claim 1 wherein said means for adjusting comprises, in combination:
   a driving means for rotating said collet a predetermined amount with respect to said drawbar;
   a fixing means for maintaining radial position of said collet with respect to the adaptor comprising:
      a keying device rotatably engaged with the adaptor, interfitting with a keyway means on said collet;
      a frictional surface of said keying device, engaged with a receiving surface of the adaptor in a manner such that significant rotational friction of predetermined intensity is created between said keying device and the adaptor;
   whereby said actuating force transmitted from the machine tool may be adjusted by threadingly advancing the collet inward or outward a predetermined amount with respect to said drawbar, and the radial position of said collet with respect to the adaptor is maintained by said fixing means during normal operation of the machine tool.

5. The adaptor of claim 4, wherein said frictional surface comprises devices selected from the group consisting of commonly available screws, set screws, spring plunger set screws, ball plunger set screws, belleville springs, wavy washers, felt washers, and elastomeric rings.

6. The adaptor of claim 4, wherein said frictional surface comprises a significantly resilient portion of said keying device interferingly engaged with said receiving surface of the adaptor.

7. The adaptor of claim 6 wherein said resilient portion is substantially ring-like and lobular.

8. The adaptor of claim 4, further including:
   a pellet of substantially solid material slidably carried in a cavity of the keying device;
   a spring-like member mounted on said keying device and pressing upon said pellet, urging the pellet to bear upon said receiving surface of the adaptor in a manner such that significant rotational friction is created between said keying device and the adaptor.

9. The adaptor of claim 8 wherein said spring-like member is a commonly available retaining ring.

10. An adaptor comprising, in combination:
    a socket means of receiving a given collet;
    a mounting means whose form is compatibly received by a given collet receptacle of a given machine tool;
    a fixing means for maintaining radial position of said collet with respect to said adaptor comprising:
       a keying device, interfitting with a keyway means on said collet, and rotatably engaged with the adaptor;
       a frictional surface of the keying device, engaged with a receiving surface of the adaptor in a manner such that significant rotational friction of predetermined intensity is created between said keying device and the adaptor;
    whereby the radial position of said collet with respect to the adaptor is maintained by said fixing means during normal operation of the machine tool.

11. The adaptor of claim 10, further including a significantly resilient portion of said keying device, interferingly engaged with said receiving surface of the adaptor, whereby said rotational friction is generated.

12. The adaptor of claim 11 wherein said resilient portion is substantially ring-like and lobular.

13. The adaptor of claim 10, further including:
    a pellet of substantially solid material slidably carried in a cavity of the keying device;
    a spring-like member mounted on said keying device and pressing upon said pellet, urging the pellet to bear upon said receiving surface of the adaptor in a manner such that significant rotational friction of predetermined intensity is created between the keying device and the adaptor.

14. The adaptor of claim 13 wherein said spring-like member is a commonly available retaining ring.

15. The adaptor of claim 13 wherein said spring-like member comprises a device selected from the group consisting of commonly available spring plunger set screws and ball plunger set screws.

16. The adaptor of claim 13, further including a multiplicity of detents located on said receiving surface and positioned to compatibly engage said pellet.

17. The adaptor of claim 10 wherein said socket means is supported a predetermined distance outward from said machine tool by a substantially cylindrical, coaxial, and unitary protuberance of the adaptor, said protuberance being of substantially smaller diameter than the external structure of said collet receptacle of said machine tool, whereby the accessibility of given tooling to a given workpiece clamped in a given collet within the adaptor is enhanced over the alternate condition of said workpiece being clamped in a given collet directly within said collet receptacle of said machine tool.

18. A collet holder comprising, in combination:
a mounting means whose form is compatibly received by a given machine tool;
a socket means of receiving a given collet;
a means of generating a longitudinal draw force for actuating said collet, comprising a substantially rigid member, rotatably attached within said collet holder, having a threaded portion threadingly engaged with said collet holder, said portion having a chosen lead that differs from, and cooperates with, that of another threaded portion of said rigid member threadingly engaged with the received collet;
whereby clamping of a given workpiece in said collet can be effected by said longitudinal force, generated with ease by a machinist upon rotation of said member with respect to said collet holder and said collet, which results from a compounded effect of differing longitudinal translocation rates of the threaded engagements of said member with said collet and said collet holder.

19. The collet holder of claim 18 wherein said mounting means comprises a form that is compatibly received by a given collet receptacle of said machine tool, whereby installation of the adaptor in said machine tool occurs in a manner significantly similar to that of a given commonly available collet of a type compatible with said receptacle of said machine tool.

20. The collet holder of claim 19 wherein said socket means is supported a predetermined distance outward from said machine tool by a substantially cylindrical, coaxial, and unitary protuberance of the adaptor, said protuberance being of substantially smaller diameter than the external structure of said collet receptacle of said machine tool, whereby the accessibility of given tooling to a given workpiece clamped in a given collet within the adaptor is enhanced over the alternate condition of said workpiece being clamped in a given collet directly within said collet receptacle of said machine tool.

* * * * *